(12) United States Patent
Fink (10) Patent No.: US 9,823,053 B1
(45) Date of Patent: Nov. 21, 2017

(54) SOLID-FUEL RAMJET AMMUNITION

(71) Applicant: The Boeing Company, Chicago, IL (US)

(72) Inventor: Lawrence E. Fink, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/250,538

(22) Filed: Aug. 29, 2016

(51) Int. Cl.
*F42B 15/00* (2006.01)
*F42B 5/10* (2006.01)
*F02K 7/10* (2006.01)

(52) U.S. Cl.
CPC ............... *F42B 15/00* (2013.01); *F42B 5/10* (2013.01); *F02K 7/10* (2013.01)

(58) Field of Classification Search
CPC ............... F42B 15/00; F42B 5/10; F02K 7/10
See application file for complete search history.

(56) References Cited

U.S. PATENT DOCUMENTS

| | | | |
|---|---|---|---|
| 2,935,946 A * | 5/1960 | Gallo | F02K 7/10 |
| | | | 102/374 |
| 2,989,919 A * | 6/1961 | Engborg | F02K 9/92 |
| | | | 102/379 |
| 3,024,729 A | 3/1962 | Kluge | |
| 3,726,219 A | 4/1973 | Bolick | |
| 4,428,293 A | 1/1984 | Botwin et al. | |
| 4,539,911 A | 9/1985 | Flatau | |
| 4,745,740 A | 5/1988 | Dunn et al. | |
| 4,796,534 A * | 1/1989 | Mikhail | F42B 10/26 |
| | | | 102/374 |
| 5,067,406 A | 11/1991 | Olson et al. | |
| 5,423,179 A | 6/1995 | Gunners et al. | |
| 5,544,586 A | 8/1996 | Huerta | |

FOREIGN PATENT DOCUMENTS

DE   EP-0151676 A2 *   8/1985   ............ F42B 15/00

* cited by examiner

*Primary Examiner* — Stephen Johnson
*Assistant Examiner* — Joshua T Semick
(74) *Attorney, Agent, or Firm* — Ostrager Chong Flaherty & Broitman P.C.

(57) ABSTRACT

A ramjet projectile comprising: an outer assembly that is tubular and comprises first, second and third portions; solid ramjet fuel attached to and disposed inside the first portion of the outer assembly; an inner assembly disposed inside the outer assembly and comprising a first portion threadably coupled to the second portion of the outer assembly and a second portion surrounded by the third portion of the outer assembly to form an annular air passageway having an air inlet. The first portion of the inner assembly comprising a plurality of openings spatially distributed about a circumference. The inner assembly is rotatable relative to the outer assembly between first and second locations displaced by a distance from each other during travel along the gun barrel. The openings are not in flow communication with the annular air passageway when the inner assembly is at the first location and are in flow communication with the annular air passageway when the inner assembly is at the second location. Preferably the solid ramjet fuel comprises boron and a binder.

20 Claims, 5 Drawing Sheets

FIG.7

SOLID-FUEL RAMJET AMMUNITION

BACKGROUND

The technology disclosed herein generally relates to ammunition. More particularly, the technology disclosed herein relates to gun-launched ramjet projectiles.

Gun range is a key element of weapon and mission effectiveness. Increased range gives the potential to leverage an overmatch advantage where the soldier or pilot can engage the enemy at a range that is greater than the range of enemy fire. The greater the range, the more time the soldier or pilot has and the more shots can be made before coming in range of an approaching enemy. Increased maximum range also usually translates into benefits of a flatter trajectory and increased striking velocity at a given range for potentially increased effectiveness. Ammunition range may be increased by raising muzzle velocity with longer tubes, using higher-energy propellants or higher working pressures, using boosted projectiles, or by improving the ballistic coefficient by reducing drag.

There is a need to extend the lethal capabilities of medium-caliber cannon munitions within a multitude of deployment scenarios.

SUMMARY

The subject matter disclosed in detail below is directed to the development of onboard propulsion that will significantly extend the range of cannon ammunition (e.g., medium-caliber ammunition having a caliber of 20-60 mm), using solid ramjet fuel. However, the concept and technology disclosed below is not limited to use in medium-caliber cannon ammunition and is applicable to a wide range of ammunition size.

Ramjets require a rocket booster, or gun launch, to achieve a flight condition where thrust is greater than drag, which for missiles is approximately Mach 2, at which point the ramjet is capable of accelerating to higher speed. Since the ramjet propulsion system depends only on its forward motion at supersonic speed to compress intake air, the engine flow-path components have no moving parts. Consequently, it has inherent simplicity, reliability, light weight, and high-speed flight capability not possible with other air-breathing engines. These attributes make the ramjet a good choice for propelling medium-caliber cannon ammunition at supersonic speed.

In a solid-fuel ramjet, air from the inlet flows through the "pipe" of fuel (also known as a "fuel grain"), which burns along its length. In accordance with a preferred embodiment disclosed in detail below, a solid-fuel ramjet projectile is provided comprising an outer assembly which is rotatable relative to the inner assembly, causing the inner assembly to displace in a forward direction relative to the outer assembly during gun launch. The inner assembly comprises a centerbody and a threaded-tube air valve that provides a structurally robust centerbody support without needing side support struts. Boron solid ramjet fuel, disposed inside the outer assembly and rearward of the threaded-tube air valve, is used to propel the ramjet projectile through the atmosphere. Prior to firing, the gun propellant is disposed inside the ramjet combustion chamber to provide volume efficiency.

The approach disclosed herein uses on-board, air-breathing propulsion to extend range. Unlike solid rocket propellant whose formulation is approximately 20% fuel and 80% oxidizer, the solid ramjet fuel disclosed herein is 100% fuel and obtains oxidizer from air, with the result being approximately four times the specific impulse (the product of thrust and time divided by propellant weight) as compared to solid rocket propellant. The higher specific impulse translates to either longer range for a given payload weight and volume, greater payload to a given range, a smaller size to a given range, or a combination of all three compared to a solid rocket motor.

One aspect of the subject matter disclosed in detail below is a ramjet projectile comprising: an outer assembly that is tubular and comprises first, second and third portions; solid ramjet fuel attached to and disposed inside the first portion of the outer assembly; an inner assembly disposed inside the outer assembly and comprising a first portion threadably coupled to the second portion of the outer assembly and a second portion surrounded by the third portion of the outer assembly to form an annular air passageway having an air inlet, the first portion of the inner assembly comprising a plurality of openings spatially distributed about a circumference, wherein the inner assembly is rotatable relative to the outer assembly between a first location and a second location displaced by a distance from the first location, the openings being not in flow communication with the annular air passageway when the inner assembly is at the first location and being in flow communication with the annular air passageway when the inner assembly is at the second location. Preferably solid ramjet fuel comprises boron and a binder.

In accordance with one embodiment of the ramjet projectile described in the preceding paragraph, the inner assembly comprises a threaded-tube air valve and an inlet centerbody threadably coupled to the threaded-tube air valve, wherein the first portion of the inner assembly is part of the threaded-tube air valve and the second portion of the inner assembly is part of the inlet centerbody. In addition, the outer assembly comprises: an outer body having a forward end comprising a circular cylindrical outer surface and a concave annular inner surface; and an inlet cowl joined to the circular cylindrical outer surface of the forward end of the outer body, wherein the first and second portions of the outer assembly are parts of the outer body, and the third portion of the outer assembly is formed by the inlet cowl and the forward end of the outer body. The threaded-tube air valve comprises a first set of threads for threadably coupling to the outer assembly and a second set of threads for threadably coupling to the inlet centerbody, wherein a handedness of the first set of threads is specified such that rotation of the outer body will cause forward translation of the threaded-tube air valve and inlet centerbody, whose own rotation will lag that of the outer body due to its inertia. The handedness of the first set of threads is opposite the handedness of the second set of threads to avoid unscrewing of the inlet centerbody when the threaded-tube air valve reaches a thread runout.

Another aspect of the subject matter disclosed in detail below is an ammunition cartridge comprising: a cartridge case comprising a cylindrical wall; an outer assembly that is tubular and comprises first, second and third portions, the first portion of the outer assembly being disposed inside and in contact with the cylindrical wall of the cartridge case, wherein the first portion of the outer assembly comprises a circular cylindrical inner surface; solid ramjet fuel attached to and disposed inside the first portion of the outer assembly, wherein the solid ramjet fuel is an annular layer on the circular cylindrical inner surface; an inner assembly disposed inside the outer assembly and comprising a first portion threadably coupled to the second portion of the outer assembly and a second portion surrounded by the third portion of the outer assembly to form an annular air passageway having an air inlet, the first portion of the inner assembly comprising a plurality of openings spatially distributed about a circumference and inner surfaces that bound a space inside the first portion of the inner assembly that is in flow communication with the openings, wherein the inner assembly is rotatable relative to the outer assembly between a first location and a second location displaced by a distance from the first location, the openings being not in flow communication with the annular air passageway when the inner assembly is at the first location and being in flow communication with the annular air passageway when the inner assembly is at the second location; and propellant occupying at least an interior space bounded in part by a portion of the cartridge case and the solid ramjet fuel. In accordance with one embodiment, the propellant further occupies at least a portion of the space inside the first portion of the inner assembly. Preferably, the solid ramjet fuel comprises boron and a binder.

A further aspect of the subject matter disclosed in detail below is a method of propelling a ramjet projectile, comprising: (a) placing an ammunition cartridge in a rifled bore of a gun barrel, the ammunition cartridge containing propellant and solid ramjet fuel and comprising a cartridge case and a ramjet projectile comprising an outer assembly that is partly encased by the cartridge case and an inner assembly disposed inside the outer assembly to form an annular channel; (b) igniting the propellant inside the ammunition cartridge while openings in the inner assembly of the ramjet projectile are not in flow communication with the annular channel; (c) combusting the propellant to propel the ramjet projectile along the rifled bore of the gun barrel; (d) causing the outer assembly of the ramjet projectile to rotate relative to the inner assembly while the ramjet projectile is being propelled along the rifled bore of the gun barrel; (e) causing the inner assembly to displace in a forward direction relative to the outer assembly as the outer assembly rotates relative to the inner assembly so that the openings are in flow communication with an annular channel between the inner and outer assemblies after the ramjet projectile has exited a muzzle of the gun barrel; and (f) combusting the solid ramjet fuel inside the outer assembly of the ramjet projectile to propel the ramjet projectile forward through an atmosphere. In accordance with one embodiment, step (e) comprises using threads on an inner surface of the outer assembly to deflect threads on an outer surface of the inner assembly in the forward direction as the outer assembly rotates relative to the inner assembly.

Other aspects of ramjet ammunition and methods for propelling ramjet projectiles are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of gun-launched ramjet ammunition are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
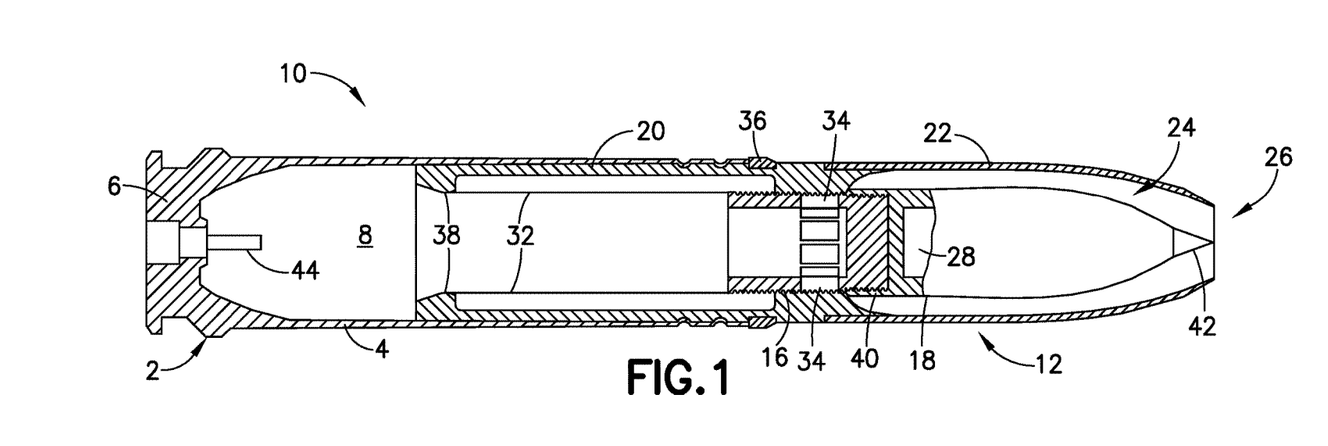
FIG. 1 is a diagram representing a partially sectioned view of an ammunition cartridge comprising a ramjet projectile in accordance with one embodiment. The ammunition cartridge is shown in its in-gun configuration.
Figure 3:
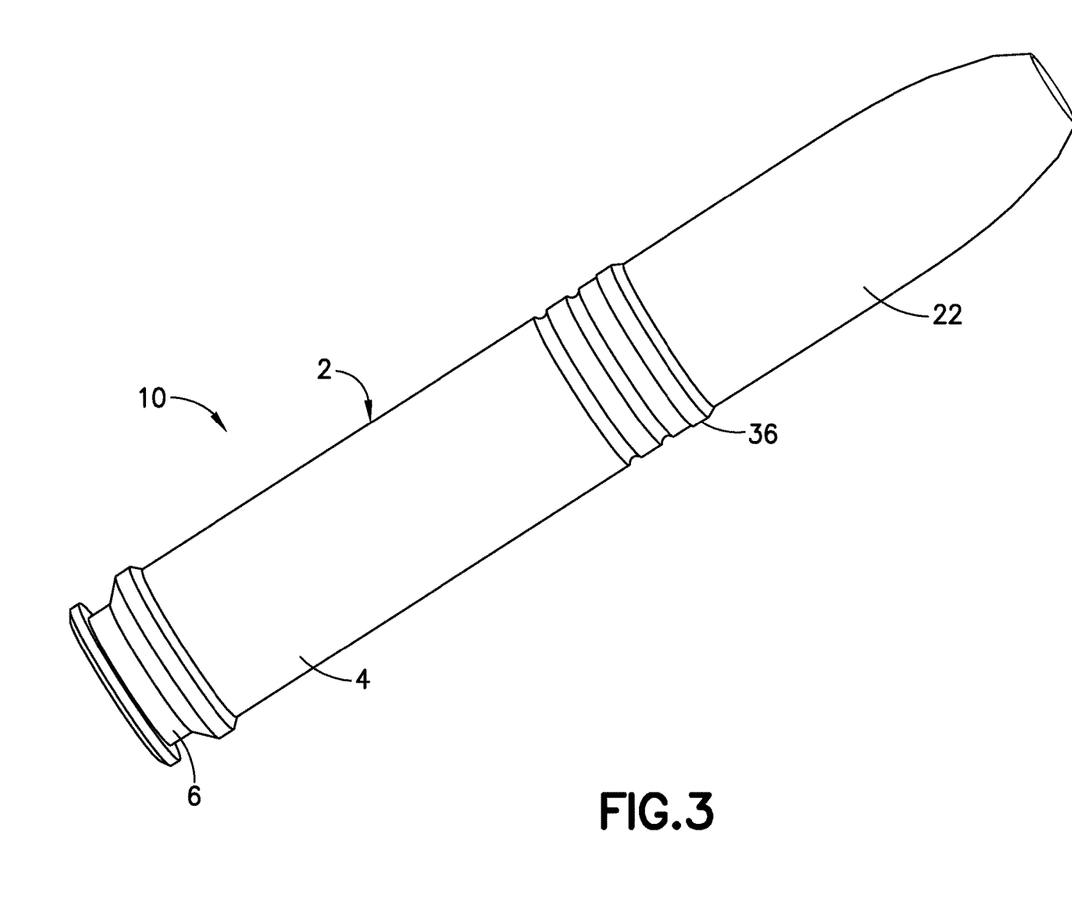
FIG. 3 is a diagram representing an external isometric view of a three-dimensional (3-D) model of the ammunition cartridge depicted in FIG. 1.

FIG. 1 is a diagram representing a partially sectioned view of an ammunition cartridge 10 in accordance with one embodiment. FIG. 3 is a diagram representing an external isometric view of a 3-D model of the ammunition cartridge 10 depicted in FIG. 1.

Referring to FIG. 1, the ammunition cartridge 10 is shown in its in-gun configuration. In this embodiment, the ammunition cartridge 10 comprises a cartridge case 2 and a ramjet projectile 12 (shown in isolation in FIG. 2). The cartridge case 2 comprises a cylindrical wall 4 and a case head 6 that closes one end of the cylindrical wall 4, the other end being open. The cartridge 10 further comprises an electric primer 44, which is inserted into a recess in the center of the base 6 of the cartridge case 2. Upon application of sufficient voltage, the primer 44 ignites the propellant 14 (see FIG. 4), thereby firing the ramjet projectile 12. The ramjet projectile 12 comprises a tubular outer assembly and an inner assembly that rotates and displaces in a forward direction relative to the outer assembly when fired.

The outer assembly of the ramjet projectile 12 comprises a tubular outer body 20 having a nozzle 38 at its rearward end. The outer body 20 is the main structure of the ramjet projectile 12. A major portion of outer body 20 is submerged in (i.e., surrounded by) the cylindrical wall 4 of the cartridge case 2 to provide the length and volume needed for ramjet fuel and combustion. The cylindrical wall 4 of the cartridge case 2 is attached to outer body 20 by conventional means. More specifically, two cannelure (i.e., crimping grooves) are provided in the outer body 20 into which the cylindrical wall 4 is crimped during final assembly. The crimp attachment ensures that the projectile remains in place and attached to the cartridge case 2 during rough handling, and it enables the initial pressure caused by the burning propellant to rise to a sufficient level for reliable and consistent firing before giving way. An annular ring of solid ramjet fuel 32 is disposed adjacent to a circular cylindrical internal surface of the outer body 20. The outer assembly further comprises an inlet cowl 22 (not surrounded by the cylindrical wall 4) that is attached to the forward end of outer body 20. The forward end of the inlet cowl 22 has a conical internal surface.

The inner assembly of the ramjet projectile 12 comprises a threaded-tube air valve 16 that is threadably coupled to threads disposed on the internal surface of a threaded portion of the outer body 20. The threaded-tube air valve 16 comprises a circular cylindrical wall. A first portion of the cylindrical wall of the threaded-tube air valve 16 has external threads for coupling with the outer body 20; a second portion of the cylindrical wall of the threaded-tube air valve 16 has a plurality of circumferentially distributed openings 34 formed therein. In the position shown in FIG. 1, these openings 34 are covered by the outer body 20. This covering of the openings 34 prevents the escape of gun gas from chamber 8 into the air passageway 24 while the ramjet projectile 12 is traveling along the length of the gun barrel (not shown in FIG. 1). In FIG. 1 (and other drawings), the openings 34 are depicted as being rectangular to simplify the drawings. However, in a preferred embodiment, each of openings 34 would have rounded forward and aft ends to avoid stress concentration at the corners of the opening.

Still referring to FIG. 1, the inner assembly further comprises an inlet centerbody 18 having a threaded portion 40 that is threadably coupled to threads disposed on the external surface of a forwardmost portion of the threaded-tube air valve 16. The inlet centerbody 18 is disposed inside the inlet cowl 22. The forward end of the inlet centerbody 18 has a conical external surface. The inlet centerbody 18 and inlet cowl 22 are configured to form an annular air passageway 24 having a double-cone, all-external compression air inlet 26. In accordance with the embodiment depicted in FIG. 1, the inlet centerbody 18 has a chamber 28 that contains an explosive charge. In alternative embodiments (e.g., for purely kinetic weapons), the chamber 28 may be eliminated. The inlet centerbody 18 may comprise a main body that is open at the forward end and a nose cap 42 that is attached to and closes the open end of the main body. The threaded-tube air valve 16, inlet centerbody 18, outer body 20 and inlet cowl 22 are preferably made of a hard metal alloy (e.g., 4340 alloy steel with Rockwell C hardness 40).

Figure 5:
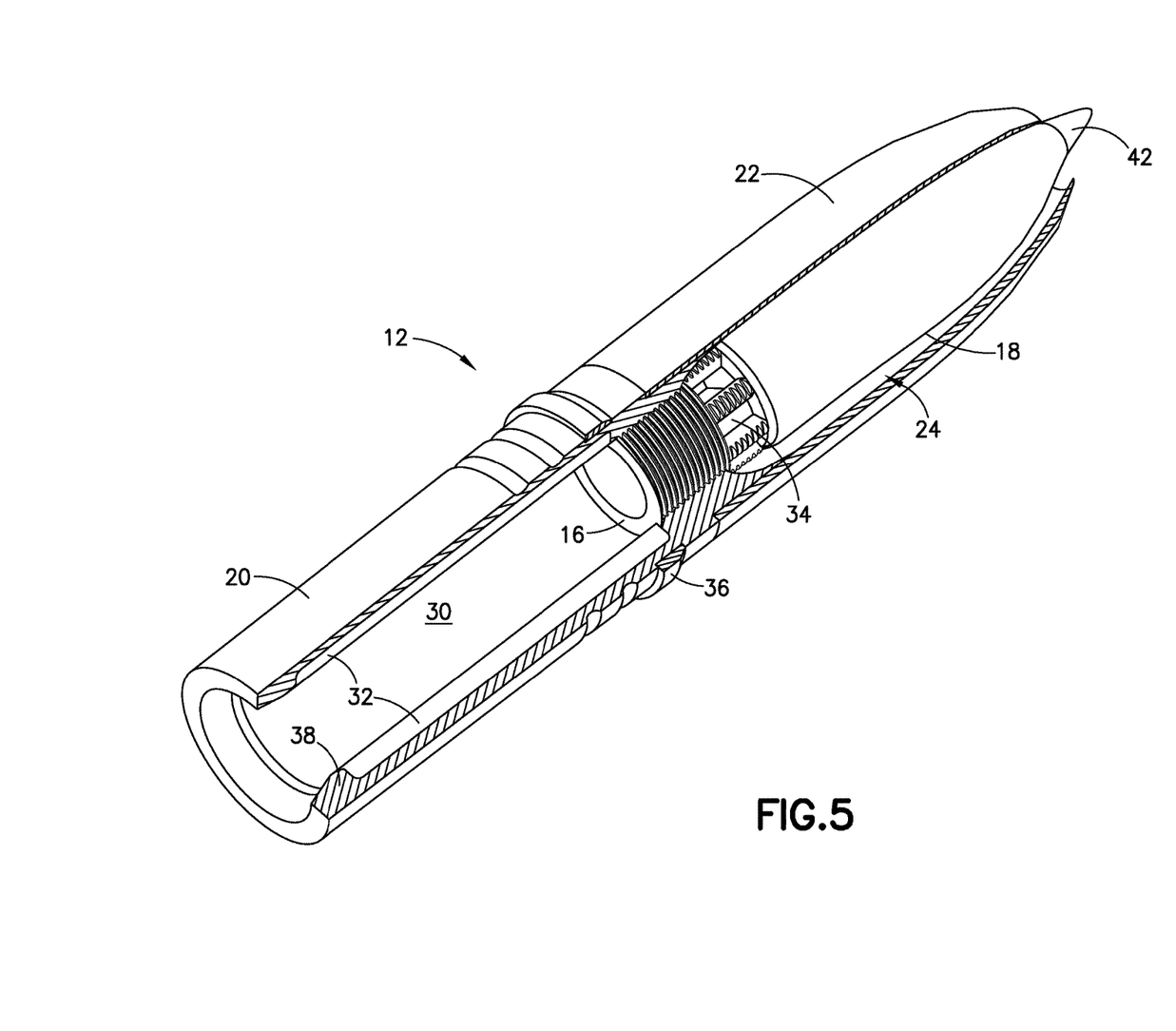
FIG. 5 is a cutaway diagram representing a 3-D model of a ramjet projectile in its in-flight configuration. Elements of an outer assembly have been removed to reveal the combustion chamber and the inner assembly in an extended position.

Prior to launch of the ramjet projectile 12, the cylindrical wall 4 and case head 6 of cartridge case 2, the solid ramjet fuel 32, and the threaded-tube air valve 16 define a chamber 8 that is filled with gun propellant in powder form (not shown in FIG. 1, but see gun propellant 14 in FIG. 5). The ammunition cartridge 10 further comprises a rotation band 36 that is seated in and affixed to an annular groove formed in the external surface of the outer body 20.

Preferably the rotation band 36 is made of a metal or metal alloy (e.g., copper or aluminum) that will be deformed by helical grooves formed in the internal surface of the gun barrel when the propellant inside chamber 8 is ignited and the ramjet projectile 12 is propelled along the length of the gun barrel while the cartridge case 2 remains behind. It is planned for the residual hot gun gas and hot air total temperature to ignite the solid ramjet fuel 32. As the ramjet projectile 12 travels toward the gun muzzle, the interaction of the helical grooves with the rotation band 36 in the gun barrel causes the outer body 20 (and the inlet cowl 22 fixedly coupled thereto) to rotate inside the gun barrel as the ramjet projectile 12 travels along its length. The inertia of the inner assembly as the outer assembly rotates causes the threaded-tube air valve 16 to not rotate in tandem with the outer body 20 (to which the threaded-tube air valve 16 is threadably coupled). Due to the threaded coupling, any rotation of the outer body 20 relative to the threaded-tube air valve 16 (and the inlet centerbody 18 threadably coupled thereto) causes the inner assembly to displace in a forward direction relative to the outer assembly, i.e., from the relative position shown in FIG. 1 to the relative position shown in FIG. 2.

Figure 2:
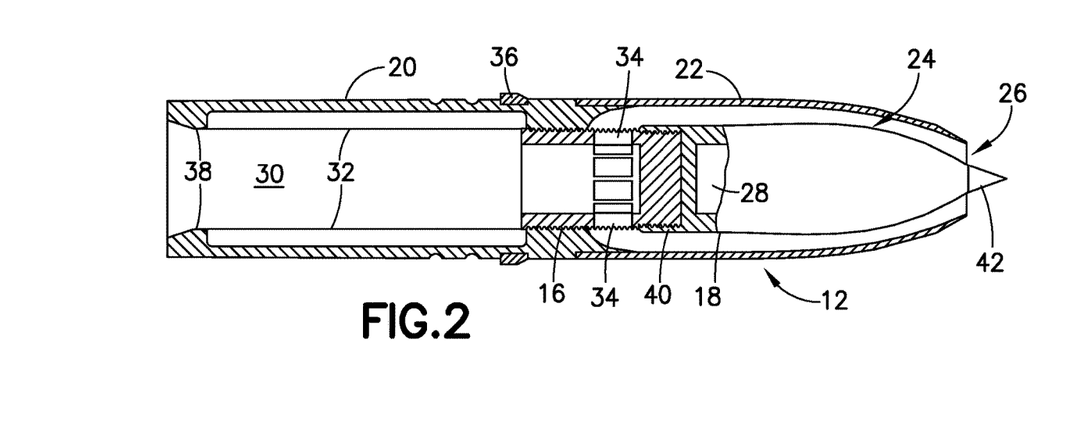
FIG. 2 is a diagram representing a partially sectioned view of the ramjet projectile of the ammunition cartridge depicted in FIG. 1. The ramjet projectile is shown in its in-flight configuration.

FIG. 2 is a diagram representing a partially sectioned view of the ramjet projectile 12 in its in-flight configuration, i.e., after the ramjet projectile 12 has exited the gun muzzle. In this configuration, the inner assembly has moved in a forward direction relative to the outer assembly to an extent that the openings 34 are no longer covered by the outer body 20. In this position, the interior volumes that are respectively surrounded by the solid ramjet fuel 32 and the threaded-tube air valve 16 form a combustion chamber 30, where combustion of the solid ramjet fuel 32 occurs during flight. In the position shown in FIG. 2, the threaded-tube air valve 16 admits air from the annular air passageway 24 into the combustion chamber 30 via openings 34, thereby providing the oxidizing agent required for combustion of the solid ramjet fuel 32. The inside diameter of the solid ramjet fuel 32 matches the throat diameter of the nozzle 38 to facilitate casting the fuel without the complexity of an expanding mandrel.

In the position shown in FIG. 2, the tip of the inlet centerbody 18 projects forward of the lip of the inlet cowl 22, which has the effect of increasing inlet efficiency by providing oblique, external shock waves rather than a single normal shock. This kind of design is well-known to those skilled in inlet design. Another feature of the translating inlet centerbody 18 is that the overall length of the assembly loaded in the gun is constrained. By extending the inlet centerbody 18 after firing, a few extra millimeters of effective length is acquired, which results in more fuel length available as compared to a non-translating design.

Figure 4:
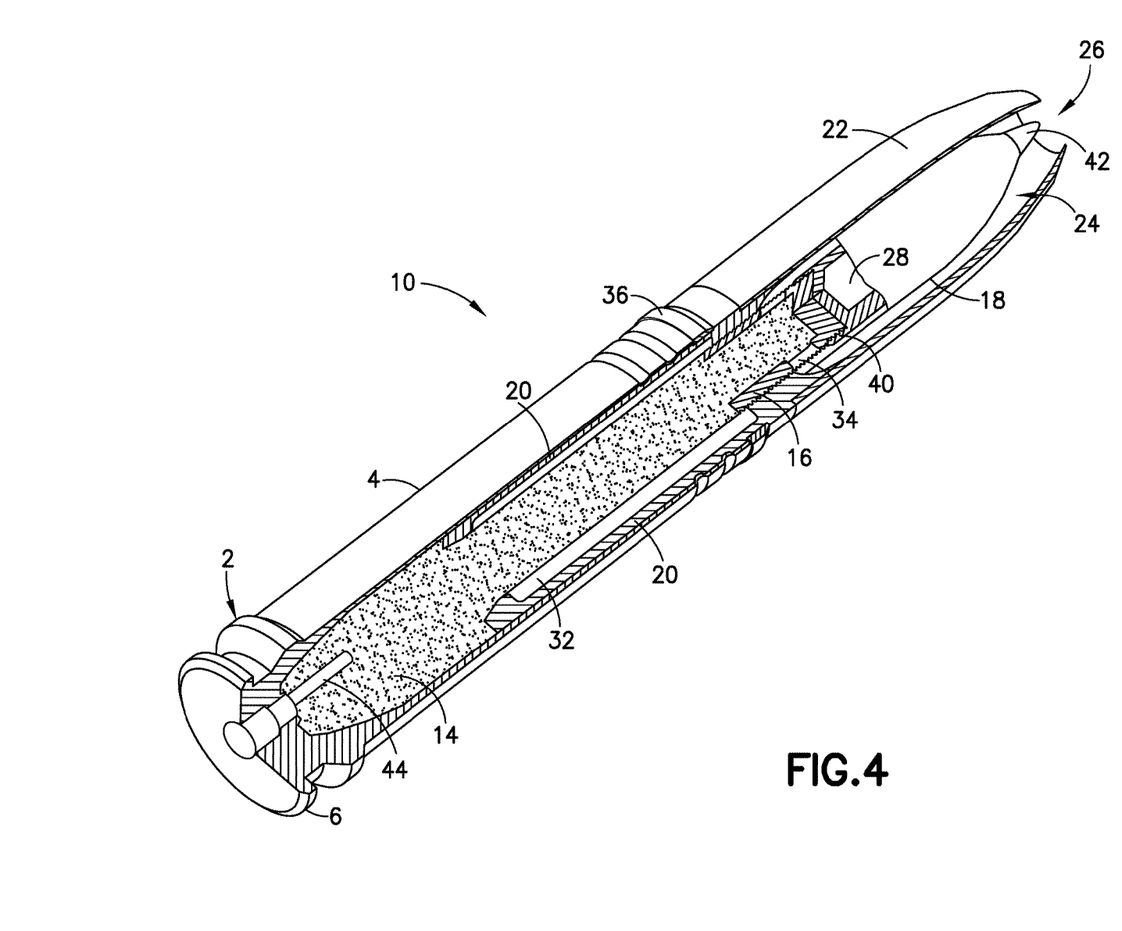
FIG. 4 is a cutaway diagram representing a 3-D model of an ammunition cartridge in its in-gun configuration. Elements of the inner and outer assemblies have been removed to reveal the propellant.

FIG. 4 is a cutaway diagram representing a 3-D model of the ammunition cartridge 10 in its in-gun configuration. Elements of the inner and outer assemblies have been removed to reveal the gun propellant 14. The gun propellant 14 may comprise a double-base ball propellant powder mixture containing nitrocellulose and nitroglycerin as explosive components. The gun propellant powder occupies the volume inside the cartridge case 2 and initially fills the ramjet combustion chamber 30 (see FIG. 2).

FIG. 5 is a cutaway diagram representing a 3-D model of a ramjet projectile 12 in its in-flight configuration. Portions of the outer assembly have been removed to reveal the combustion chamber 30, the solid ramjet fuel 32 and the inner assembly in an extended position. The inlet centerbody 18 is hollowed-out from the front and has a thin-wall nose cap 42. The inlet centerbody 18 and inlet cowl 22 are configured to form an air passageway 24 having a double-cone, all-external compression air inlet 26. The inlet cowl 22 is press-fit onto the outer body 20. A steel shim is optionally used between the forward end of the threaded-tube air valve 16 and the inlet centerbody 18 to adjust the critical longitudinal distance between the tip of the extended inlet centerbody 18 and the tip of inlet cowl 22.

In accordance with the embodiment depicted in FIG. 5, the openings 34 in the threaded-tube air valve 16 comprise eight longitudinal slots circumferentially distributed at equal angular intervals. During flight of the ramjet projectile 12, atmospheric air enters the air inlet 26 and flows in sequence through the annular air passageway 24, the openings 34, and the combustion chamber 30. This air flow provides oxidizing agent for the combustion of the solid ramjet fuel 32 inside the combustion chamber 30. The combustion products are then ejected out the nozzle 38, propelling the ramjet projectile forward.

Preferably the solid ramjet fuel 32 is castable high-energy BMF-013 fuel, which is commercially available from Aerojet Rocketdyne, Sacramento, Calif. The formulation of BMF-013 fuel is 50% boron in a hydroxyl-terminated polybutadiene binder. This fuel formulation has a density of 0.05 lb/cu inch and a heating value of 20,040 Btu/lb. The ability of the solid ramjet fuel to withstand the high-acceleration environment may be improved by changing to an epoxy binder. Either a burn rate increase of 70% to maintain a circular port, or a perimeter factor of 1.7 (i.e. fuel "spokes"), or combination, is predicted to be required compared to the baseline fuel burning rate. Higher burning rates have been demonstrated with additives to BMF-013, and a grain design with perimeter factor up to about 2.0 is feasible. BMF-013 fuel is known to auto-ignite at the 510° F. (266° C.) initial air total temperature, but a small amount of energetic material at the head end of the fuel grain, such as a sliver of rocket propellant ignited by residual hot gun gas, or a poison pill igniter (a heat-triggered safety feature used to ignite rocket propellant before full onset of oxidizer decomposition) can be used to mitigate risk and ensure.

The boron solid ramjet fuels represent the state of the art. Prior to their development, an all-hydrocarbon fuel designated UTF-18,818 was the standard. Though lower in heating value and density than boron fuel, it is still viable and it (or a similar all-hydrocarbon fuel like the Aerojet Rocketdyne BMF-003) is an alternative to the boron fuels.

Figures 6, 7:
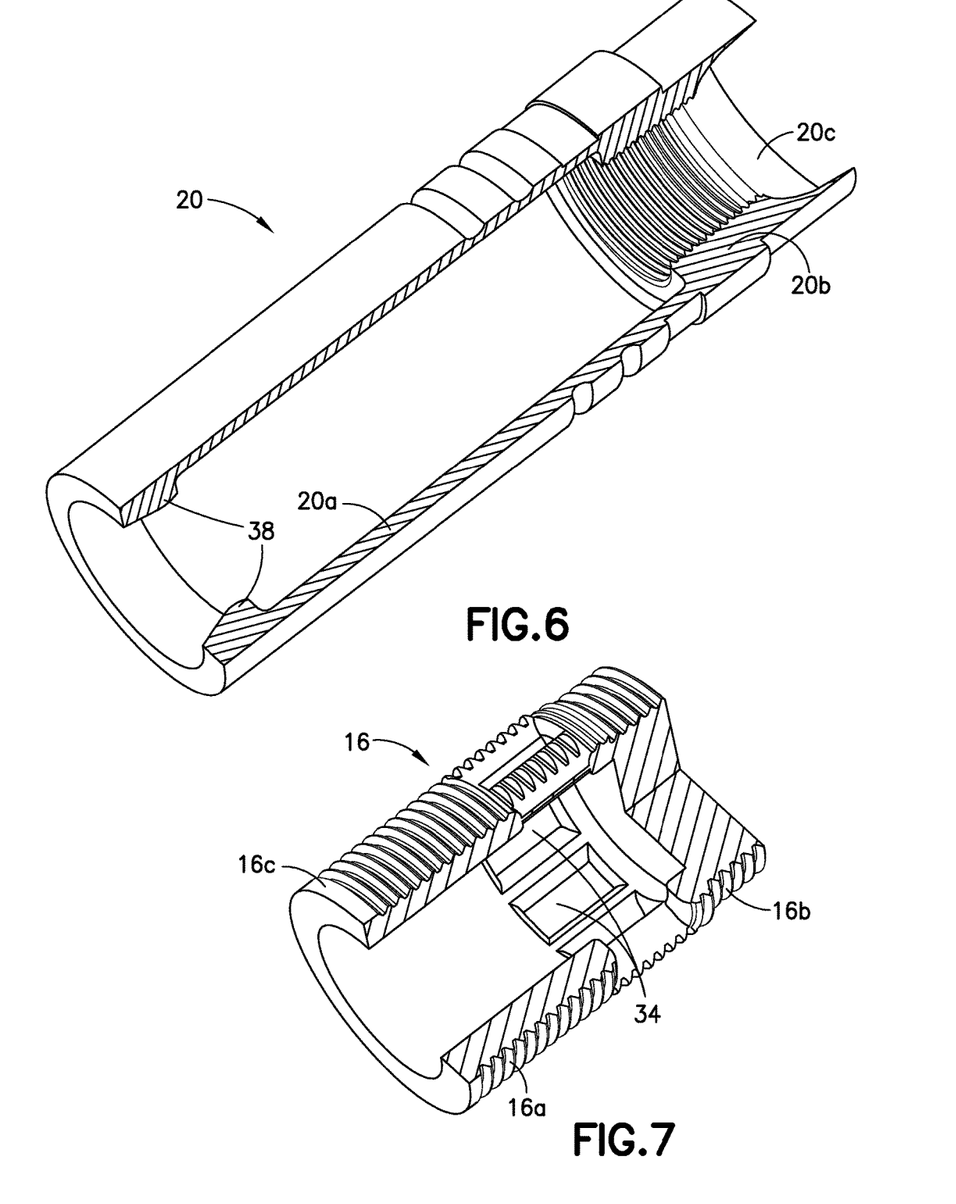
FIG. 6 is a cutaway diagram representing a 3-D model of the outer body of the ramjet projectile depicted in FIG. 2. A portion of the outer body has been removed to reveal its internal structure.
FIG. 7 is a cutaway diagram representing a 3-D model of the threaded-tube air valve of the ramjet projectile depicted in FIG. 2. A portion of the threaded-tube air valve has been removed to reveal its internal structure.

FIG. 6 is a cutaway diagram representing a 3-D model of the outer body 20 of the ramjet projectile depicted in FIGS. 2 and 5. A portion of the outer body 20 has been removed to reveal its internal structure. The outer body 20 comprises a circular cylindrical portion 20a that surrounds the annular ring of solid ramjet fuel (not shown in FIG. 6), an internally threaded ring-shaped portion 20b and a concave ring-shaped portion 20c that forms the rearwardmost portion of the annular air passageway 24 seen in FIGS. 2 and 5. The nozzle 38 is integrally formed with the circular cylindrical portion 20a.

FIG. 7 is a cutaway diagram representing a 3-D model of the threaded-tube air valve 16 of the ramjet projectile depicted in FIGS. 2 and 5. A portion of the threaded-tube air valve 16 has been removed to reveal its internal structure. The threaded-tube air valve 16 comprises an externally threaded circular cylindrical portion 16a having openings 34, an externally threaded circular head 16b and a thread runout 16c. The threads of the externally threaded circular cylindrical portion 16b have a diameter less than the diameter of the threads of the externally threaded circular head 16a to provide clearance for assembly. In the assembled state, the threads of the externally threaded circular cylindrical portion 16a interengage the opposing threads of the internally threaded ring-shaped portion 20b, while the threads of the externally threaded circular head 16b interengage the opposing threads of an internally threaded ring-shaped portion 40 (visible in FIGS. 2 and 4) of the inlet centerbody 18. The handedness of the threads of the externally threaded circular cylindrical portion 16a is specified such that rotation of the outer body 20 will cause forward translation of the threaded-tube air valve 16 and inlet centerbody 18, whose own rotation will lag that of the outer body 20 due to its inertia. The handedness of the threads of the externally threaded circular cylindrical portion 16a is opposite the handedness of the threads of the externally threaded circular cylindrical portion 16b to avoid unscrewing of the inlet centerbody 18 when the threaded-tube air valve 16 reaches the thread runout 16c. In accordance with one implementation, the ammunition cartridge 10 depicted in FIG. 1 can be designed to fit the application of the 30-mm M789 ammunition in the M230 weapon system (Apache helicopter gun) without modification to the gun. The double-cone, all-external compression air inlet 26 is designed to operate at Mach 1.85. A design issue for the threaded-tube air valve 16 is to avoid stripping of threads due to the high in-barrel pressure. Standard 18×1.0 mm left-handed threads were used with an effective engagement length of 9.5 mm, accounting for missing threads due to the openings 34, and exceed the minimum design requirement of 8.7 mm.

The inner assembly (i.e., threaded-tube air valve 16 and inlet centerbody 18) relies on its inertia to cause it to lag the initial outer body rotation (caused by engagement of the rotation band 36 with the gun barrel rifling), to extend the inlet centerbody 18 forward because of the threads, and make an air flow path through the openings 34 and the inside of threaded-tube air valve 16, into the ramjet combustion chamber 30.

The threaded-tube air valve 16 is initially submerged one thread pitch length into the outer body 20 to maintain a seal for the time the ramjet projectile 12 is in the gun barrel (less than one revolution). The threaded-tube air valve 16 is fully open (as seen in FIG. 5) approximately 0.01 second after leaving the gun barrel. Since the ramjet projectile 12 spins clockwise (viewed from the rear), the threads between the threaded-tube air valve 16 and outer body 20 are left-handed. The threaded-tube air valve 16 is solid forward of the openings 34. The externally threaded circular head 16b seen in FIG. 7 has standard 13-mm right-handed threads to securely attach the inlet centerbody 18 when the thread runout at the 18-mm-threaded aft end of the threaded-tube air valve 16 engages the outer body 20 and causes the inlet centerbody 18 to rotate to match the rotation of the outer body 20. The thickness of the threaded-tube air valve 16 matches the required step-height for a downstream recirculation zone and adequate flameholding for fuel combustion.

The technology disclosed hereinabove has strong transition potential for multi-service application in a wide-range of guns for ground, ship, and air platforms. The only discriminating requirement is a muzzle velocity on the order of at least 500 m/sec.

To summarize some of the aspects disclosed above, one method of propelling a ramjet projectile is characterized by the following steps: (a) placing an ammunition cartridge in a rifled bore of a gun barrel, the ammunition cartridge containing propellant and solid ramjet fuel and comprising a cartridge case and a ramjet projectile comprising an outer assembly that is partly encased by the cartridge case and an inner assembly disposed inside the outer assembly to form an annular channel; (b) igniting the propellant inside the ammunition cartridge while openings in the inner assembly of the ramjet projectile are not in flow communication with the annular channel; (c) combusting the propellant to propel the ramjet projectile along the rifled bore of the gun barrel; (d) causing the outer assembly of the ramjet projectile to rotate relative to the inner assembly while the ramjet projectile is being propelled along the rifled bore of the gun barrel; (e) causing the inner assembly to displace in a forward direction relative to the outer assembly as the outer assembly rotates relative to the inner assembly so that the openings are in flow communication with an annular channel between the inner and outer assemblies after the time when the ramjet projectile has exited a muzzle of the gun barrel; and (f) combusting the solid ramjet fuel inside the outer assembly of the ramjet projectile as the ramjet projectile exits the muzzle of the gun barrel to propel the ramjet projectile forward through an atmosphere. In particular, step (e) comprises using threads on an inner surface of the outer assembly to deflect threads on an outer surface of the inner assembly in the forward direction as the outer assembly rotates relative to the inner assembly. Steps (c), (d) and (e) are performed concurrently.

For avoidance of doubt concerning support for the various terms which appear in the appended apparatus claims, the following correlation of claim limitations with disclosed structure is provided: (1) the circular cylindrical portion 20a of outer body 20 is the structure corresponding to the first portion of the outer assembly recited in the claims; (2) the internally threaded ring-shaped portion 20b of outer body 20 is the structure corresponding to the second portion of the outer assembly recited in the claims; (3) the a concave ring-shaped portion 20c of outer body 20 and the inlet cowl 22 are the structures corresponding to the third portion of the outer assembly recited in the claims; (4) the externally threaded circular cylindrical portion 16a of threaded-tube air valve 16 is the structure corresponding to the first portion of the inner assembly recited in the claims; and (5) the inlet centerbody 18 is the structure corresponding to the second portion of the inner assembly recited in the claims.

While ramjet projectiles and methods of ramjet propulsion have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude portions of two or more steps (such as the steps of combusting propellant, causing the outer assembly of the ramjet projectile to rotate relative to the inner assembly, and causing the inner assembly to displace relative to the outer assembly) being performed concurrently.

The invention claimed is:

1. A ramjet projectile comprising:
   an outer assembly that is tubular and comprises first, second and third portions;
   solid ramjet fuel attached to and disposed inside the first portion of the outer assembly;
   an inner assembly disposed inside the outer assembly and comprising a first portion threadably coupled to the second portion of the outer assembly and a second portion surrounded by the third portion of the outer assembly to form an annular air passageway having an air inlet, the first portion of the inner assembly comprising a plurality of openings spatially distributed about a circumference,
   wherein the inner assembly is rotatable relative to the outer assembly between a first location and a second location displaced by a distance from the first location, the openings being not in flow communication with the annular air passageway when the inner assembly is at the first location and being in flow communication with the annular air passageway when the inner assembly is at the second location.

2. The ramjet projectile as recited in claim 1, wherein an inner surface of the third portion of the outer assembly has a circular profile of varying radius, and an outer surface of the second portion of the inner assembly has a circular profile of varying radius.

3. The ramjet projectile as recited in claim 1, wherein inner surfaces of the first portion of the inner assembly bound a space which is in flow communication with the annular air passageway via the openings when the inner assembly is at the second location.

4. The ramjet projectile as recited in claim 3, wherein the first portion of the outer assembly comprises a circular cylindrical inner surface, and the solid ramjet fuel is an annular layer on the circular cylindrical inner surface that bounds a chamber which is adjacent to and in flow communication with the space inside the first portion of the inner assembly.

5. The ramjet projectile as recited in claim 4, wherein the first portion of the outer assembly further comprises an outlet having a minimum radius less than a radius of the inner surface of the first portion of the outer assembly.

6. The ramjet projectile as recited in claim 1, wherein the inner assembly comprises a tapered nose that does not project forward of the outer assembly when the inner assembly is at the first location and that projects forward of the outer assembly when the inner assembly is at the second location.

7. The ramjet projectile as recited in claim 1, wherein the solid ramjet fuel comprises boron and a binder.

8. The ramjet projectile as recited in claim 1, wherein the inner assembly comprises a threaded-tube air valve and an inlet centerbody threadably coupled to the threaded-tube air valve, wherein the first portion of the inner assembly is part of the threaded-tube air valve and the second portion of the inner assembly is part of the inlet centerbody.

9. The ramjet projectile as recited in claim 8, wherein the threaded-tube air valve comprises a first set of threads for threadably coupling to the outer assembly and a second set of threads for threadably coupling to the inlet centerbody, wherein a handedness of the first set of threads is opposite a handedness of the second set of threads.

10. The ramjet projectile as recited in claim 8, further comprising an explosive charge housed inside the inlet centerbody.

11. The ramjet projectile as recited in claim 1, wherein the outer assembly comprises:
    an outer body having a forward end comprising a circular cylindrical outer surface and a concave annular inner surface; and
    an inlet cowl joined to the circular cylindrical outer surface of the forward end of the outer body,
    wherein the first and second portions of the outer assembly are parts of the outer body, and the third portion of the outer assembly is formed by the inlet cowl and the forward end of the outer body.

12. The ramjet projectile as recited in claim 1, wherein the second portion of the outer assembly closes the openings when the inner assembly is at the first location and does not close the openings when the inner assembly is at the second location.

13. An ammunition cartridge comprising:
a cartridge case comprising a cylindrical wall;
an outer assembly that is tubular and comprises first, second and third portions, the first portion of the outer assembly being disposed inside and in contact with the cylindrical wall of the cartridge case, wherein the first portion of the outer assembly comprises a circular cylindrical inner surface;
solid ramjet fuel attached to and disposed inside the first portion of the outer assembly, wherein the solid ramjet fuel is an annular layer on the circular cylindrical inner surface;
an inner assembly disposed inside the outer assembly and comprising a first portion threadably coupled to the second portion of the outer assembly and a second portion surrounded by the third portion of the outer assembly to form an annular air passageway having an air inlet, the first portion of the inner assembly comprising a plurality of openings spatially distributed about a circumference and inner surfaces that bound a space inside the first portion of the inner assembly that is in flow communication with the openings, wherein the inner assembly is rotatable relative to the outer assembly between a first location and a second location displaced by a distance from the first location, the openings being not in flow communication with the annular air passageway when the inner assembly is at the first location and being in flow communication with the annular air passageway when the inner assembly is at the second location; and
propellant occupying at least an interior space bounded in part by a portion of the cartridge case and the solid ramjet fuel.

14. The ammunition cartridge as recited in claim 13, wherein the propellant further occupies at least a portion of the space inside the first portion of the inner assembly.

15. The ammunition cartridge as recited in claim 13, wherein the solid ramjet fuel comprises boron and a binder.

16. The ammunition cartridge as recited in claim 13, wherein the inner assembly comprises a threaded-tube air valve and an inlet centerbody threadably coupled to the threaded-tube air valve, wherein the first portion of the inner assembly is part of the threaded-tube air valve and the second portion of the inner assembly is part of the inlet centerbody.

17. The ammunition cartridge as recited in claim 13, wherein the outer assembly comprises:

an outer body having a forward end comprising a circular cylindrical outer surface and a concave annular inner surface; and
an inlet cowl joined to the circular cylindrical outer surface of the forward end of the outer body,
wherein the first and second portions of the outer assembly are parts of the outer body, and the third portion of the outer assembly is formed by the inlet cowl and the forward end of the outer body.

18. The ammunition cartridge as recited in claim 13, wherein the second portion of the outer assembly closes the openings when the inner assembly is at the first location and does not close the openings when the inner assembly is at the second location.

19. A method of propelling a ramjet projectile, comprising:
(a) placing an ammunition cartridge in a rifled bore of a gun barrel, the ammunition cartridge containing propellant and solid ramjet fuel and comprising a cartridge case and a ramjet projectile comprising an outer assembly that is partly encased by the cartridge case and an inner assembly disposed inside the outer assembly to form an annular channel;
(b) igniting the propellant inside the ammunition cartridge while openings in the inner assembly of the ramjet projectile are not in flow communication with the annular channel;
(c) combusting the propellant to propel the ramjet projectile along the rifled bore of the gun barrel;
(d) causing the outer assembly of the ramjet projectile to rotate relative to the inner assembly while the ramjet projectile is being propelled along the rifled bore of the gun barrel;
(e) causing the inner assembly to displace in a forward direction relative to the outer assembly as the outer assembly rotates relative to the inner assembly so that the openings are in flow communication with an annular channel between the inner and outer assemblies after the ramjet projectile has exited a muzzle of the gun barrel; and
(f) combusting the solid ramjet fuel inside the outer assembly of the ramjet projectile to propel the ramjet projectile forward through an atmosphere.

20. The method as recited in claim 19, wherein step (e) comprises using threads on an inner surface of the outer assembly to deflect threads on an outer surface of the inner assembly in the forward direction as the outer assembly rotates relative to the inner assembly.

\* \* \* \* \*